US008009335B2

(12) United States Patent
Honda

(10) Patent No.: US 8,009,335 B2
(45) Date of Patent: Aug. 30, 2011

(54) IMAGE-READING PROCESSING APPARATUS, IMAGE READING APPARATUS, AND IMAGE-READING PROCESSING METHOD

(75) Inventor: Keiji Honda, Ishikawa (JP)

(73) Assignee: PFU Limited, Ishikawa (JP)

( * ) Notice: Subject to any disclaimer, the term of this patent is extended or adjusted under 35 U.S.C. 154(b) by 787 days.

(21) Appl. No.: 12/113,760

(22) Filed: May 1, 2008

(65) Prior Publication Data
US 2009/0009825 A1 Jan. 8, 2009

(30) Foreign Application Priority Data
Jul. 6, 2007 (JP) ................................ 2007-178952

(51) Int. Cl.
*H04N 1/04* (2006.01)
*H04N 1/46* (2006.01)
(52) U.S. Cl. ......... 358/488; 358/496; 358/474; 358/505
(58) Field of Classification Search .................. 358/1.1, 358/488, 494, 496, 497, 49, 8
See application file for complete search history.

(56) References Cited

FOREIGN PATENT DOCUMENTS

| JP | 08-317138 A | 11/1996 |
|---|---|---|
| JP | 2001-358914 A | 12/2001 |
| JP | 2006-005834 A | 5/2006 |
| JP | 2006-229858 A | 8/2006 |

*Primary Examiner* — Thierry L Pham
(74) *Attorney, Agent, or Firm* — Lowe, Hauptman, Ham & Berner, LLP

(57) ABSTRACT

An image-reading processing apparatus is connected to an image reading apparatus being capable of reading both surface images of a document, including a storage unit and a control unit, wherein the control unit includes a double-face reading control unit that controls the image reading apparatus to scan both the surfaces of the document, a coordinate acquiring unit that acquires a coordinate group of a position serving as an edge candidate of the document based on a grayscale value in image data of each of the surfaces read by the double-face reading control unit, a straight line detecting unit that detects a straight line group corresponding to an edge portion of the document based on the coordinate group acquired by the coordinate acquiring unit, a straight line inverting unit that inverts the straight line group detected by the straight line detecting unit, and a straight line selecting unit that determines the straight line group suitable for the edge portion from the document in the straight line group detected by the straight line detecting unit on one surface and the straight line group inverted by the straight line inverting unit on the other surface to select the straight line group.

19 Claims, 10 Drawing Sheets

FIG.1
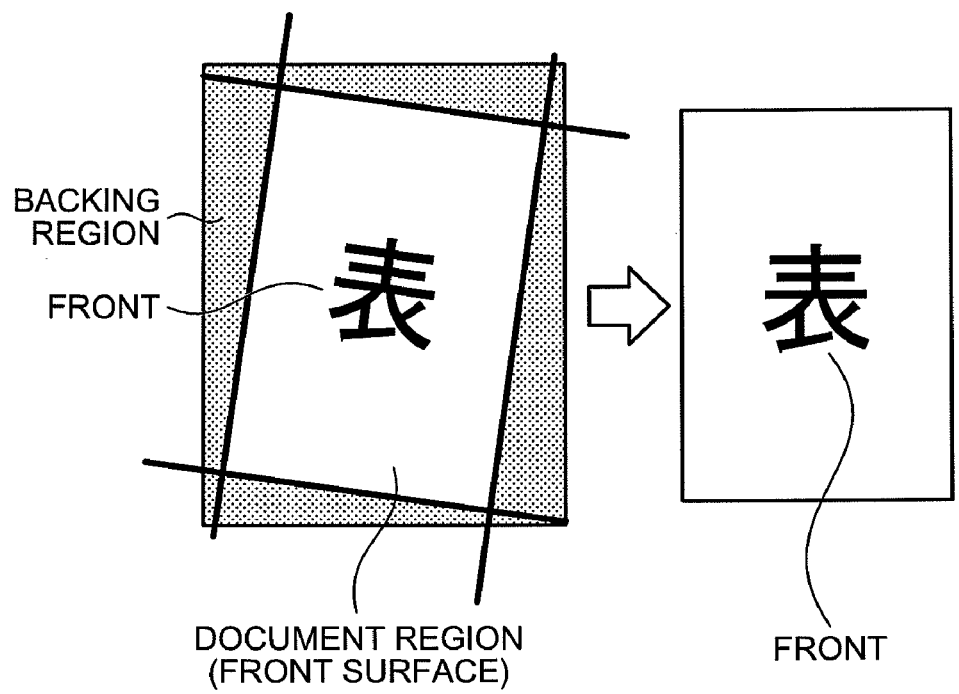
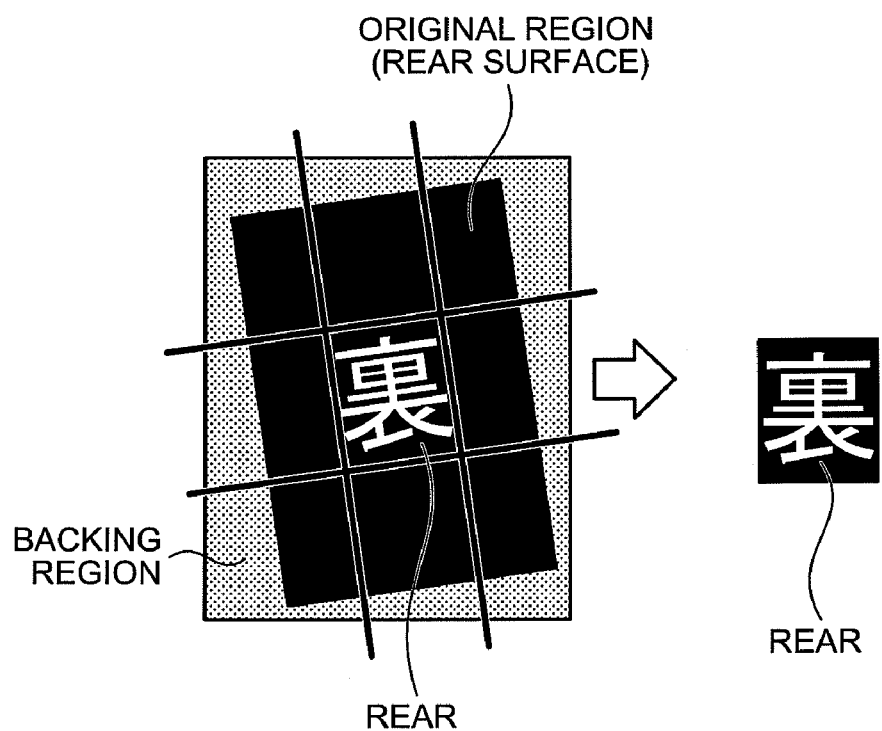

FIG.10
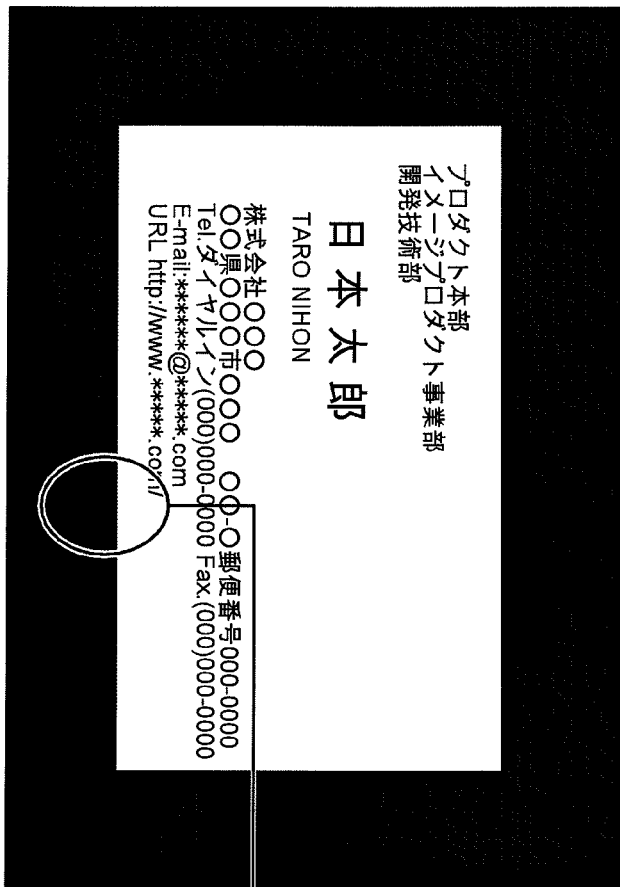
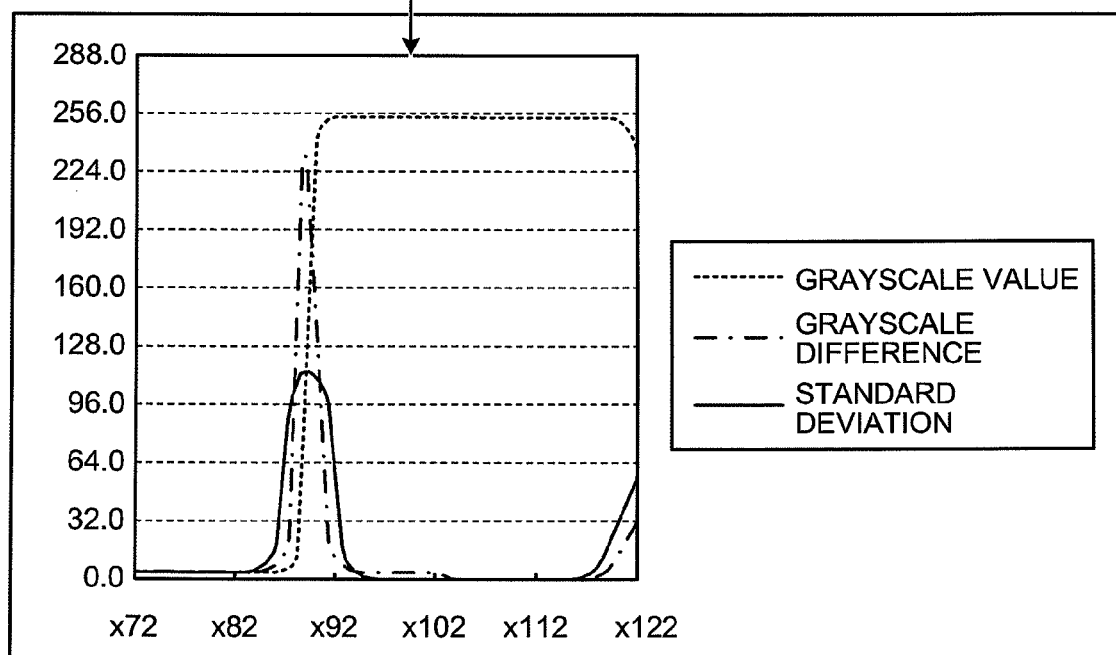

IMAGE-READING PROCESSING APPARATUS, IMAGE READING APPARATUS, AND IMAGE-READING PROCESSING METHOD

RELATED APPLICATIONS

The present application is based on, and claims priority from, Japan Application Number 2007-178952, filed Jul. 6, 2007, the disclosure of which is hereby incorporated by reference herein in its entirety.

BACKGROUND OF THE INVENTION

1. Field of the Invention

The present invention relates to an image-reading processing apparatus, an image reading apparatus, and an image-reading processing method.

2. Description of the Related Art

A conventional method determines a document region based on a density difference between a ground color of a backing portion of an image reading apparatus and a ground color of a document to perform deskewing, cropping of the document region, determination of an image size, and the like, of image data read by the image reading apparatus.

For example, an image reading apparatus according to JP-A-2001-358914 detects a position and a width of a document from an output from a line sensor to correct a skew of image data read by the line sensor and determines the skew based on a detection result.

An image reading apparatus according to JP-A-8-317138 is an apparatus that arranges a uniform-density material at an image readable position to detect a document size, optically detects a boundary between the material and the document, and detects a document position and a document width.

There is a method that makes the backing portion of the image reading apparatus a white-to-black switching mechanism to automatically recognize a document region and makes a backing portion black in image reading to generate contrast between the backing portion and the document.

An image reading apparatus according to JP-A-2006-229858 reads the front and rear surfaces of the document to recognize binder holes of the document, converts a resolution of a read image to a lower resolution, and detects portions having common characteristic amounts on front-surface and rear-surface images each having the low resolution as holes of the document.

An image reading apparatus according to JP-A-2006-5834 is an apparatus that arranges a plurality of uniform density reference plates at readable positions of a photoelectric conversion unit to detect a document size, reads both the surfaces of the document together with the uniform density reference plates, and detects the document size of one read data depending on a density difference.

However, in the conventional image reading apparatus, when a difference between a density of the backing portion and a density of the document is little, a document region cannot be detected, deskewing, cropping of the document region, determination of the document size, and the like are unsuccessful. For example, in the image reading apparatus according to JP-A-2001-358914 or JP-A-8-317138, when the backing portion is black, and when the ground color of the document has a high density (black or the like), the document region cannot be recognized, and deskewing or cropping is unsuccessful. FIG. 1 is a pattern diagram showing a problem in an identifying process for a document region in the conventional technology.

As shown in the upper-side part (front surface of FIG. 1), the conventional image reading apparatus recognizes a density difference (contrast difference) between the ground color of the backing region and the ground color of the document region of read image to determine the document region. As shown in the upper-side part of FIG. 1, in general, the ground color of the document is assumed to be white, and the backing region has a dense ground color. In this case, a high contrast can be obtained at a document edge portion.

However, as shown in a lower-side part (rear surface) of FIG. 1, when the ground color of the document is a deep color, a sufficient contrast difference between the document and the backing region cannot be obtained, and the document region cannot be identified (the contents of the document is erroneously recognized as a document edge in the lower-side part of FIG. 1). Therefore, deskewing or cropping of the document region is unsuccessful.

In the image reading apparatus according to JP-A-2006-229858, it is assumed that the document is white. When the ground color of the document is blackish, a hole region is unsuccessfully detected. Furthermore, detection accuracy may be deteriorated due to a low resolution, and there is no unit that sets an appropriate resolution depending on an object to be detected.

In the image reading apparatus according to JP-A-2006-5834, to use for switching the uniform density reference plates, a photoelectric conversion unit must be movable in a sub-reading direction. To install the photoelectric conversion unit in an Auto Document feeder (ADF) type image reading apparatus, an increase in cost or size, complication of control, and the like are disadvantageously caused. Even when the image reading apparatus according to JP-A-2006-5834 is used, a ground color of a front surface may have a density (for example, white to white) equal to that of the backing portion for the front surface, and the ground color of the rear surface may have a density (for example, black to black) equal to that of the backing portion for the rear surface. For this reason, the document region cannot be recognized, so that an erroneous detection may be disadvantageously performed.

SUMMARY OF THE INVENTION

It is an object of the present invention to at least partially solve the problems in the conventional technology.

An image-reading processing apparatus according to one aspect of the present invention is connected to an image reading apparatus being capable of reading both surface images of a document, including a storage unit and a control unit, wherein the control unit includes a double-face reading control unit that controls the image reading apparatus to scan both the surfaces of the document, a coordinate acquiring unit that acquires a coordinate group of a position serving as an edge candidate of the document based on a grayscale value in image data of each of the surfaces read by the double-face reading control unit, a straight line detecting unit that detects a straight line group corresponding to an edge portion of the document based on the coordinate group acquired by the coordinate acquiring unit, a straight line inverting unit that inverts the straight line group detected by the straight line detecting unit, and a straight line selecting unit that determines the straight line group suitable for the edge portion from the document in the straight line group detected by the straight line detecting unit on one surface and the straight line group inverted by the straight line inverting unit on the other surface to select the straight line group.

An image-reading processing apparatus according to another aspect of the present invention is connected to an image reading apparatus being capable of reading both surface images of a document, including a storage unit and a control unit, wherein the control unit includes a double-face reading control unit that controls the image reading apparatus to scan both the surfaces of the document, a coordinate acquiring unit that acquires a coordinate group of a position serving as an edge candidate of the document based on a grayscale value in image data of each of the surfaces read by the double-face reading control unit, a coordinate inverting unit that inverts the coordinate line group acquired by the coordinate acquiring unit, a coordinate selecting unit that selects the two coordinates indicating a maximum value and a minimum value on each horizontal line and each vertical line of the coordinate group detected by the coordinate acquiring unit on one surface and the coordinate group inverted by the coordinate inverting unit on the other surface to acquire a coordinate group, and a straight line selecting unit that detects a straight line group corresponding to an edge portion of the document based on the coordinate group acquired by the coordinate selecting unit.

An image-reading processing method according to still another aspect of the present invention is executed by an image-reading processing apparatus connected to an image reading apparatus being capable of reading both surface images of a document, including a storage unit and a control unit, wherein the method includes a double-face reading control step of controlling the image reading apparatus to scan both the surfaces of the document, a coordinate acquiring step of acquiring a coordinate group of a position serving as an edge candidate of the document based on a grayscale value in image data of each of the surfaces read at the double-face reading control step, a straight line detecting step of detecting a straight line group corresponding to an edge portion of the document based on the coordinate group acquired at the coordinate acquiring step, a straight line inverting step of inverting the straight line group detected at the straight line detecting step, and a straight line selecting step of determining to select the straight line group suitable for the edge portion from the document in the straight line group detected at the straight line detecting step on one surface and the straight line group inverted at the straight line inverting step on the other surface.

An image-reading processing method according to still another aspect of the present invention is executed by an image-reading processing apparatus connected to an image reading apparatus being capable of reading both surface images of a document, including a storage unit and a control unit, wherein the method includes a double-face reading control step of controlling the image reading apparatus to scan both the surfaces of the document, a coordinate acquiring step of acquiring a coordinate group of a position serving as an edge candidate of the document based on a grayscale value in image data of each of the surfaces read at the double-face reading control step, a coordinate inverting step of inverting the coordinate line group acquired at the coordinate acquiring step, a coordinate selecting step of selecting the two coordinates indicating a maximum value and a minimum value on each horizontal line and each vertical line of the coordinate group detected at the coordinate acquiring step on one surface and the coordinate group inverted at the coordinate inverting step on the other surface to acquire a coordinate group, and a straight line selecting step of detecting a straight line group corresponding to an edge portion of the document based on the coordinate group acquired at the coordinate selecting step.

An image reading apparatus according to still another aspect of the present invention is capable of reading both surface images of a document, including a storage unit and a control unit, wherein the control unit includes a double-face reading control unit that controls to scan both the surfaces of the document, a coordinate acquiring unit that acquires a coordinate group of a position serving as an edge candidate of the document based on a grayscale value in image data of each of the surfaces read by the double-face reading control unit, a straight line detecting unit that detects a straight line group corresponding to an edge portion of the document based on the coordinate group acquired by the coordinate acquiring unit, a straight line inverting unit that inverts the straight line group detected by the straight line detecting unit, and a straight line selecting unit that determines the straight line group suitable for the edge portion from the document in the straight line group detected by the straight line detecting unit on one surface and the straight line group inverted by the straight line inverting unit on the other surface to select the straight line group.

An image reading apparatus according to still another aspect of the present invention is capable of reading both surface images of a document, including a storage unit and a control unit, wherein the control unit includes a double-face reading control unit that controls to scan both the surfaces of the document, a coordinate acquiring unit that acquires a coordinate group of a position serving as an edge candidate of the document based on a grayscale value in image data of each of the surfaces read by the double-face reading control unit, a coordinate inverting unit that inverts the coordinate line group acquired by the coordinate acquiring unit, a coordinate selecting unit that selects the two coordinates indicating a maximum value and a minimum value on each horizontal line and each vertical line of the coordinate group detected by the coordinate acquiring unit on one surface and the coordinate group inverted by the coordinate inverting unit on the other surface to acquire a coordinate group, and a straight line selecting unit that detects a straight line group corresponding to an edge portion of the document based on the coordinate group acquired by the coordinate selecting unit.

An image-reading processing method according to still another aspect of the present invention is executed by an image reading apparatus being capable of reading both surface images of a document, including a storage unit and a control unit, wherein the method includes a double-face reading control step of controlling to scan both the surfaces of the document, a coordinate acquiring step of acquiring a coordinate group of a position serving as an edge candidate of the document based on a grayscale value in image data of each of the surfaces read at the double-face reading control step, a straight line detecting step of detecting a straight line group corresponding to an edge portion of the document based on the coordinate group acquired at the coordinate acquiring step, a straight line inverting step of inverting the straight line group detected at the straight line detecting step, and a straight line selecting step of determining to select the straight line group suitable for the edge portion from the document in the straight line group detected at the straight line detecting step on one surface and the straight line group inverted at the straight line inverting step on the other surface.

An image-reading processing method according to still another aspect of the present invention is executed by an image reading apparatus being capable of reading both surface images of a document, including a storage unit and a control unit, wherein the method includes, a double-face reading control step of controlling to scan both the surfaces of the document, a coordinate acquiring step of acquiring a coordinate group of a position serving as an edge candidate of the document based on a grayscale value in image data of each of the surfaces read at the double-face reading control step, a coordinate inverting step of inverting the coordinate line group acquired at the coordinate acquiring step, a coordinate selecting step of selecting the two coordinates indicating a maximum value and a minimum value on each horizontal line and each vertical line of the coordinate group detected at the coordinate acquiring step on one surface and the coordinate group inverted at the coordinate inverting step on the other surface to acquire a coordinate group, and a straight line selecting step of detecting a straight line group corresponding to an edge portion of the document based on the coordinate group acquired at the coordinate selecting step.

The present invention relates to a program that is read by a computer to cause the computer to execute the method.

The present invention relates to a recording medium in which the program is recorded.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a pattern diagram showing a problem in an identifying process for a document region in the conventional technology;

FIG. 10 is a diagram showing an example of the coordinate acquiring process by the coordinate acquiring unit 102b.

DETAILED DESCRIPTION OF THE PREFERRED EMBODIMENTS

Embodiments of an image-reading processing apparatus, an image reading apparatus, an image-reading processing method and program, and a recording medium according to the present invention will be explained below with reference to the accompanying drawings. The present invention is not limited to the embodiment.

Outline of the Present Invention

An outline of the present invention will be explained below. Thereafter, configurations, processes, and the like of the present invention will be explained below in detail.

The present invention generally has the following basic characteristic features.

The image-reading processing apparatus of the present invention is connected to an image reading apparatus capable of reading images on both the surfaces of a document and includes a storage unit and a controlling unit.

The image-reading processing apparatus controls the image reading apparatus to scan both the surfaces of the document.

The image-reading processing apparatus acquires a coordinate group (not shown) of positions serving as edge candidates of the document based on grayscale values in image data of each of the read surfaces.

In this case, the "positions serving as edge candidates of a document" may be a position where a grayscale value changes, a position where a grayscale value exceeds a predetermined value, or a position where a statistical index of the grayscale value is equal to or larger than a predetermined threshold value. Furthermore, the image-reading processing apparatus may create reference data based on image data of a region the breadth of which is a backing portion, compare the image data with the reference data, and acquire coordinates of a position where a predetermined difference occurs as a position serving as an edge candidate of the document.

Figure 2:
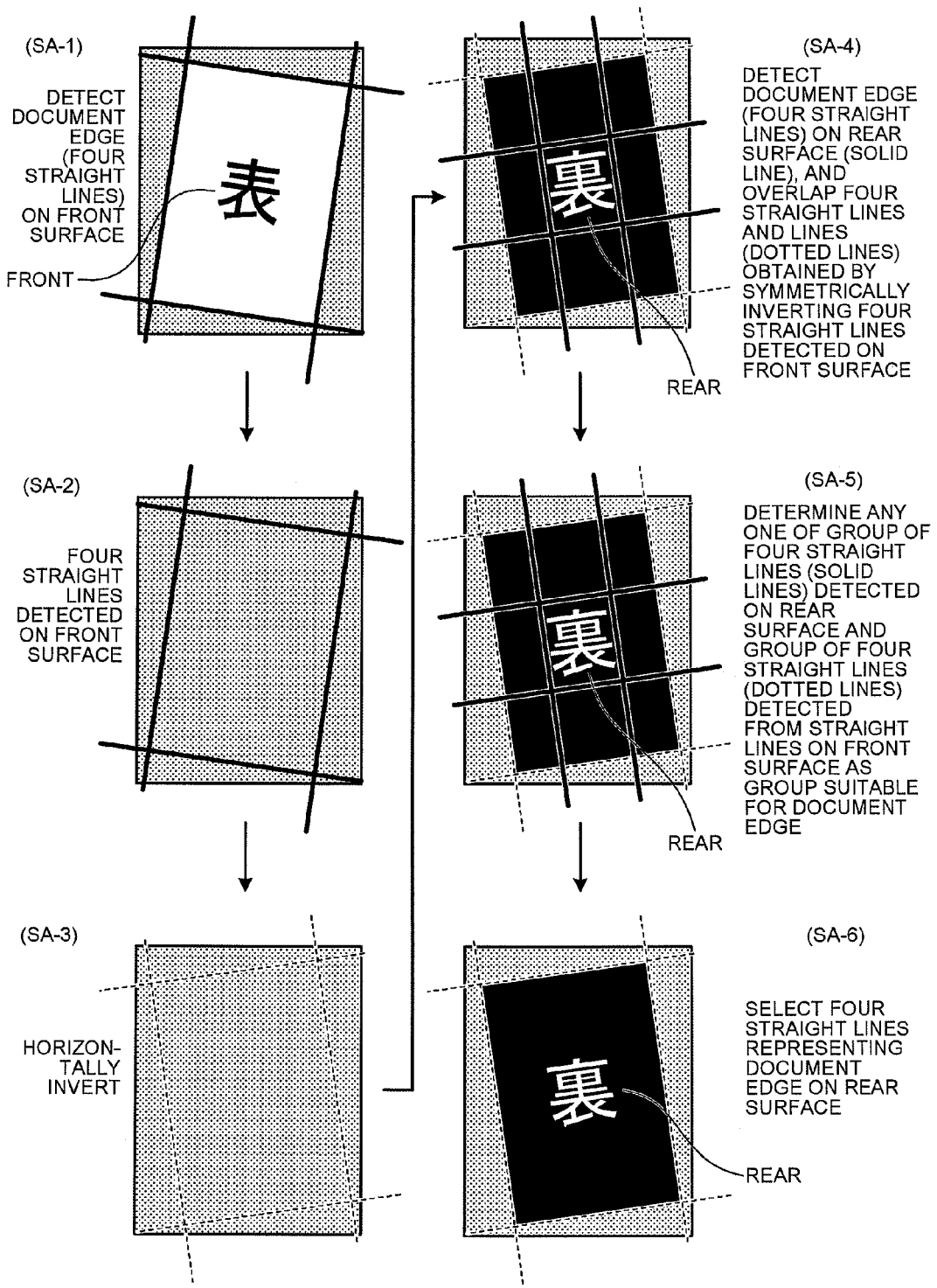
FIG. 2 is a flow chart typically showing an example of recognition of a document region in a read image obtained by the process of the image-reading processing apparatus according to the present invention.

The image-reading processing apparatus detects a straight line group corresponding to an edge portion of the document based on the acquired coordinate group. More specifically, as shown in SA-1 and SA-2 in FIG. 2, the image-reading processing apparatus detects four straight lines (indicated by solid lines, respectively) corresponding to the edge portion of the document from the coordinate group (not shown).

The image-reading processing apparatus inverts the detected straight line group. More specifically, edge shapes of the document on the front surface and the rear surface are symmetrical to each other because the same document is read in opposite directions. As indicated by a broken line in SA-3 in FIG. 2, the image-reading processing apparatus horizontally inverts the four straight lines.

The image-reading processing apparatus determines straight lines suitable for the edge portion of the document from a straight line group detected on one surface and a straight line inverted from the other surface to select the straight line group. More specifically, as an example, as indicated by SA-4 to SA-6 in FIG. 2, four straight lines (indicated by solid lines, respectively) detected on the rear surface and four straight lines (indicated by dotted lines, respectively) are overlapped (step SA-4). A straight line group suitable for the document edges is determined (step SA-5), and four appropriate straight lines are selected (step SA-6).

In this case, the image-reading processing apparatus may be controlled to select straight lines constituting an outermost contour from the straight line groups.

Configuration of Image-reading Processing Apparatus

Figure 3:
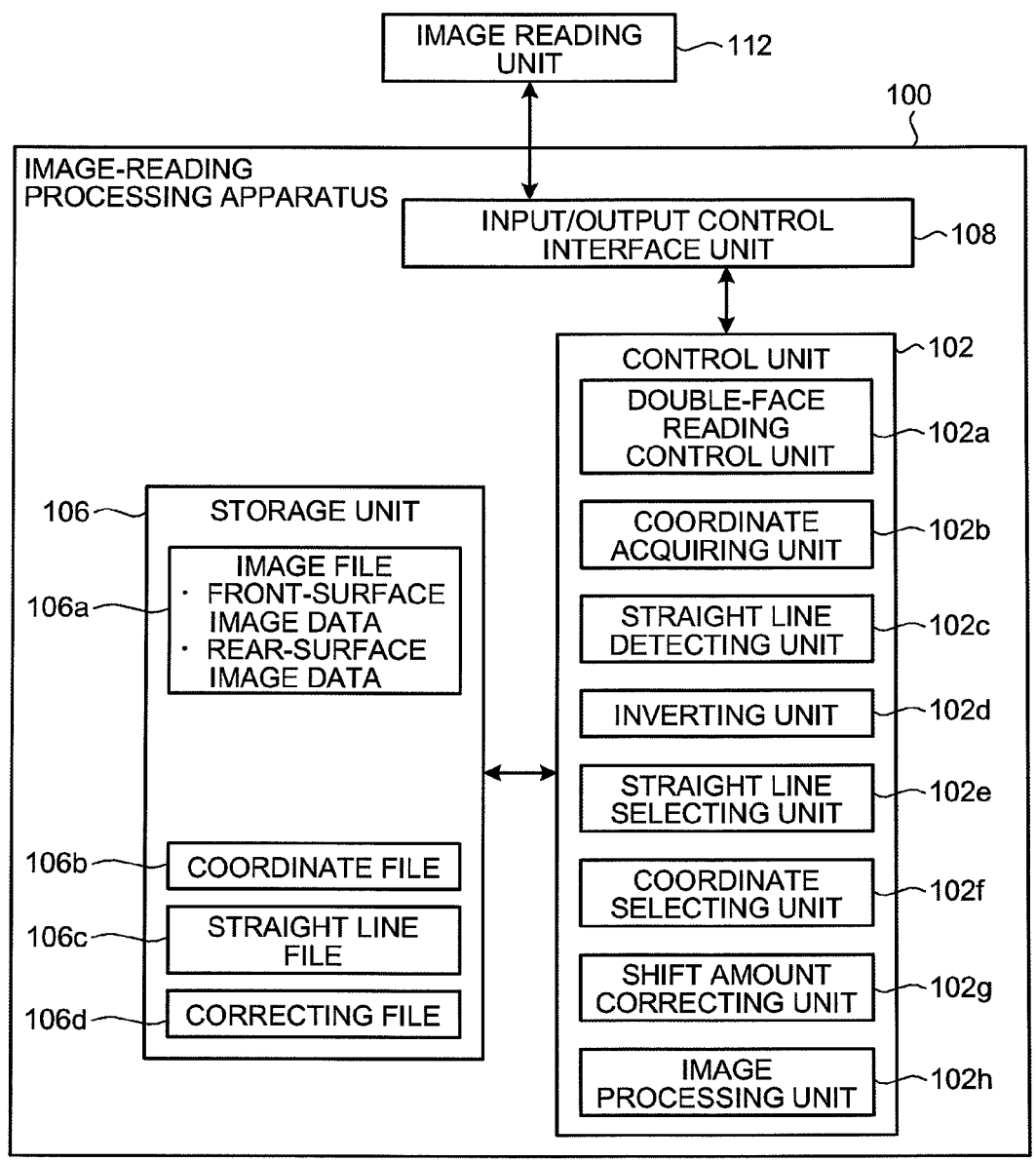
FIG. 3 is a block diagram showing an example of the configuration of the image-reading processing apparatus to which the present invention is applied.

A configuration of the image-reading processing apparatus will be explained below. FIG. 3 conceptually shows only parts related to the present invention.

In FIG. 3, an image-reading processing apparatus 100 generally includes a control unit 102 such as a CPU that controls the entire operation of the image-reading processing apparatus 100, an input/output control interface unit 108 connected to the image reading unit 112, and a storage unit 106 in which various databases, various tables, and the like are stored.

These components are communicably connected to each other through an arbitrary communication path.

The various databases and the various tables (image file 106a to correcting file 106d) stored in the storage unit 106 are storage units such as fixed disk devices. The storage units store various programs, various tables, various databases, and the like used in various processes.

Of the constituent elements of the storage unit 106, the image file 106a stores read image data. The information stored in the image file 106a, includes front-surface image data and a rear-surface image data of a document as shown in FIG. 3.

The coordinate file 106b stores coordinates of a portion having a change in grayscale in the image data.

The straight line file 106c stores data of a detected straight line.

The correcting file 106d stores a shift amount of coordinates between the front surface and the rear surface.

In FIG. 3, the input/output control interface unit 108 controls the image reading unit 112.

In FIG. 3, the control unit 102 has an internal memory to store a control program such as an Operating System (OS), a program that defines various procedures and the like, and required data. According to the programs and the like, information processing for executing various processes is performed. The control unit 102 functionally and conceptually includes a double-face reading control unit 102a, a coordinate acquiring unit 102b, a straight line detecting unit 102c, an inverting unit 102d, a straight line selecting unit 102e, a coordinate selecting unit 102f, a shift amount correcting unit 102g, and an image processing unit 102h.

Of these components, the double-face reading control unit 102a controls the image reading unit 112 through the input/output control interface unit 108 to scan both the surfaces of the document.

The coordinate acquiring unit 102b acquires a coordinate group of positions serving as edge candidates of the document based on grayscale values in the image data of the surfaces read by the double-face reading control unit 102a. In this case, the coordinate acquiring unit 102b may acquire, as the "positions serving as the edge candidates of the document", a position having a change in grayscale, a position where a grayscale value exceeds a predetermined threshold value, or a position where a statistical index of the grayscale value is equal to or larger than the predetermined threshold value. Furthermore, the coordinate acquiring unit 102b may create reference data based on image data of a region the breadth of which is a backing portion, compare the image data with the reference data, and acquire coordinates of a position where a predetermined difference occurs as "a position serving as an edge candidate of the document".

In this case, the coordinate acquiring unit 102b may perform searching from both the ends of each horizontal line in the image data to acquire two coordinates at which a change in grayscale (grayscale difference), a grayscale value, or a statistical index (for example, a standard deviation, a variance) being equal to or larger than each of the threshold values, or a difference between the coordinates and the reference data appears first. Further, the coordinate acquiring unit 102b may perform searching from both the ends of each vertical line in the image data to acquire two coordinates at which a change in grayscale (grayscale difference), a grayscale value, or a statistical index being equal to or larger than each of the threshold value, or a difference between the coordinates and the reference data appears first.

The straight line detecting unit 102c detects a straight line (to be referred to as an "actually measured straight line") group corresponding to an edge portion of the document based on the coordinate group acquired by the coordinate acquiring unit 102b, and stores the straight line group in the straight line file 106c. In this case, the straight line detecting unit 102c may use Hough transformation or a least-square method to detect straight lines from the coordinate groups. In this case, the straight line detecting unit 102c may detect the straight line group corresponding to the edge portions of the document based on the coordinate group acquired by the coordinate selecting unit 102f.

The inverting unit 102d inverts coordinates or straight lines according to the symmetric property between the front surface and the rear surface. For example, the inverting unit 102d may invert a straight line group stored in the straight line file 106c detected by the straight line detecting unit 102c to create a straight line (to be referred to as an "arithmetic straight line" in comparison to an "actually measured straight line") group. The inverting unit 102d may invert the coordinates acquired by the coordinate acquiring unit 102b.

The straight line selecting unit 102e determines a straight line group suitable for the edge portion of the document from the actually measured straight line group detected by the straight line detecting unit 102c on one surface and the arithmetic straight line group inverted by the inverting unit 102d on the other surface to select the straight line group. In this case, the straight line selecting unit 102e may select straight lines constituting an outermost contour from the straight line group.

The coordinate selecting unit 102f selects two coordinates representing the maximum value and the minimum value of four coordinates including the two coordinates acquired by the coordinate acquiring unit 102b on one surface and the two coordinates inverted by the inverting unit 102d on the other surface in each horizontal line and each vertical line to acquire a coordinate group.

The shift amount correcting unit 102g corrects image data of the surfaces stored in the image file 106a based on the shift amount data stored in the correcting file 106d. In this case, the shift amount correcting unit 102g may measure a shift amount between the coordinates of the front surface and the rear surface and store the shift amount in the correcting file 106d.

The image processing unit 102h determines a document region based on the straight line group selected by the straight line selecting unit 102e and executes image processing such as deskewing or cropping of the document region.

Process of Image-reading Processing Apparatus 100

An example of the process of the system according to the embodiment thus configured is explained in detail with reference to FIGS. 4 to 9.

Image Reading Process

Figure 4:
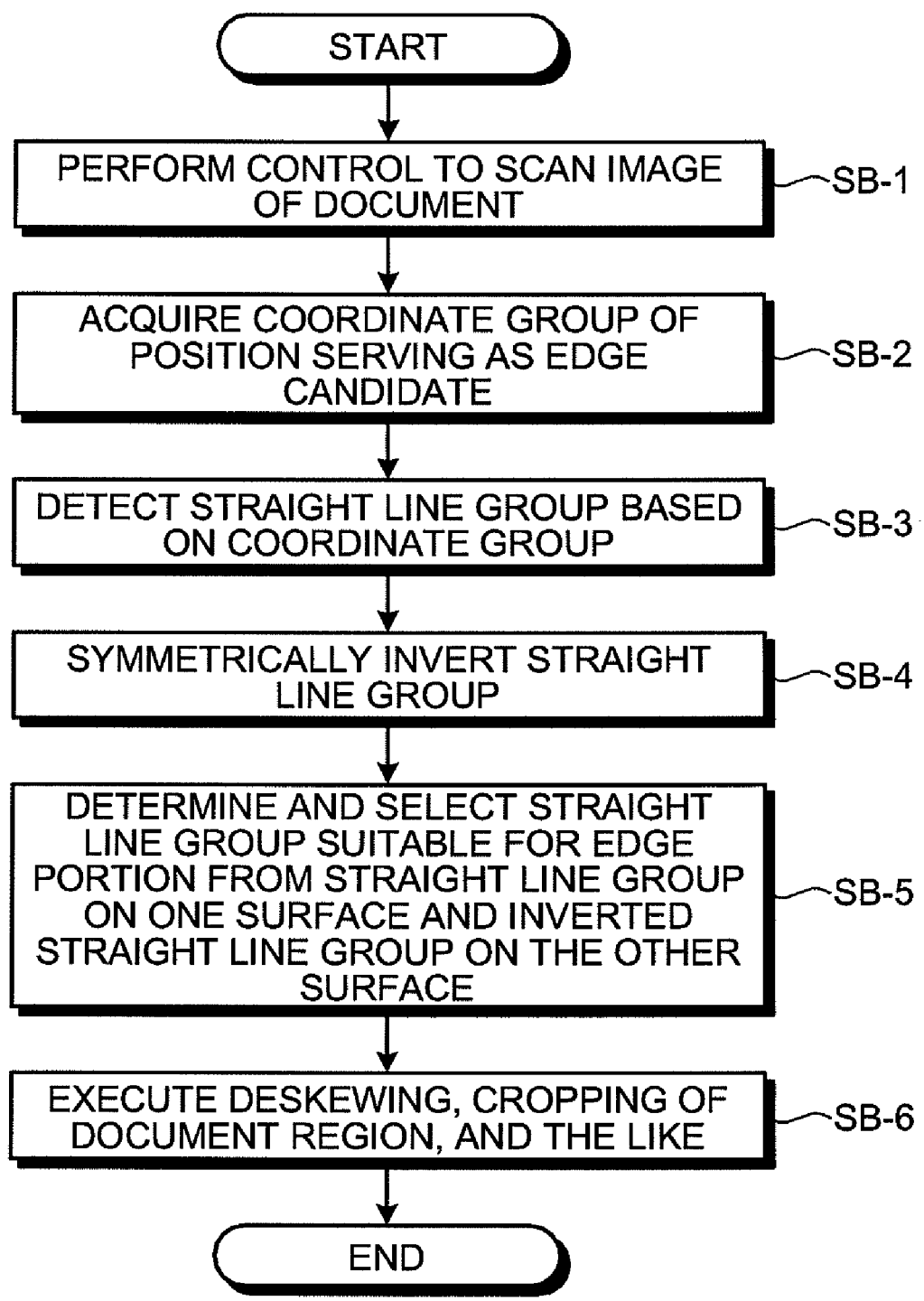
FIG. 4 is a flow chart showing an example of the image reading process of the image-reading processing apparatus 100 according to the embodiment.

Details of the image reading process will be explained below with reference to FIG. 4.

The double-face reading control unit 102a controls the image reading unit 112 through the input/output control interface unit 108, to scan both the surfaces of a document, and stores the read image data in the image file 106a (step SB-1).

The coordinate acquiring unit 102b acquires a coordinate group serving as positions serving as the edge candidates of the document based on grayscale values in the image data on each of the surfaces read by the double-face reading control unit 102a and stored in the image file 106a (step SB-2). In this case, the coordinate acquiring unit 102b may acquire, as the positions serving as the edge candidates of the document, coordinates of a position having a change in grayscale, a position where a grayscale value exceeds a predetermined threshold value, a position where a statistical index of the grayscale value is equal to or larger than the predetermined threshold value. Furthermore, the coordinate acquiring unit 102b may create reference data based on image data of a region the breadth of which is a backing portion, compare the image data with the reference data, and acquire coordinates of a position where a predetermined difference occurs as a position serving as an edge candidate of the document. The coordinate acquiring unit 102b may perform searching from both the ends of each horizontal line in the image data on the surfaces to acquire two coordinates at which a change in grayscale (grayscale difference), a grayscale value, or a statistically mechanical index (for example, a standard deviation, a variance, or the like) being equal to or larger than each of the predetermined threshold values, or a difference between the coordinates and the reference data appears first. Further, the coordinate acquiring unit 102b may perform searching from both the ends of each vertical line in the image data to acquire two coordinates at which a change in grayscale (grayscale difference), a grayscale value, or a statistically mechanical index being equal to or larger than each of the predetermined threshold values, or a difference between the coordinates and the reference data appears first.

The straight line detecting unit 102c detects a straight line group of actually measured straight lines corresponding to the edge portion of the document based on the coordinate group acquired by the coordinate acquiring unit 102b and stores the straight line group in the straight line file 106c (step SB-3). In this case, the straight line detecting unit 102c may use Hough transformation or a least-square method to detect the straight lines from the coordinate groups.

The inverting unit 102d inverts the straight line group consisting of the actually measured straight lines detected by the straight line detecting unit 102c according to the symmetric property between the front surface and the rear surface to create arithmetic straight lines (step SB-4).

The straight line selecting unit 102e determines a straight line group suitable for the edge portion of the document from the actually measured straight line group detected by the straight line detecting unit 102c on one surface and the arithmetic straight line group inverted by the inverting unit 102d on the other surface to select the straight line group (step SB-5). In this case, the straight line selecting unit 102e may select straight lines constituting an outermost contour from the straight line group.

The image processing unit 102h determines a document region based on the straight line group selected by the straight line selecting unit 102e and executes image processing such as deskewing and cropping of the document region (step SB-6)

Coordinate Acquiring Process

Figure 5:
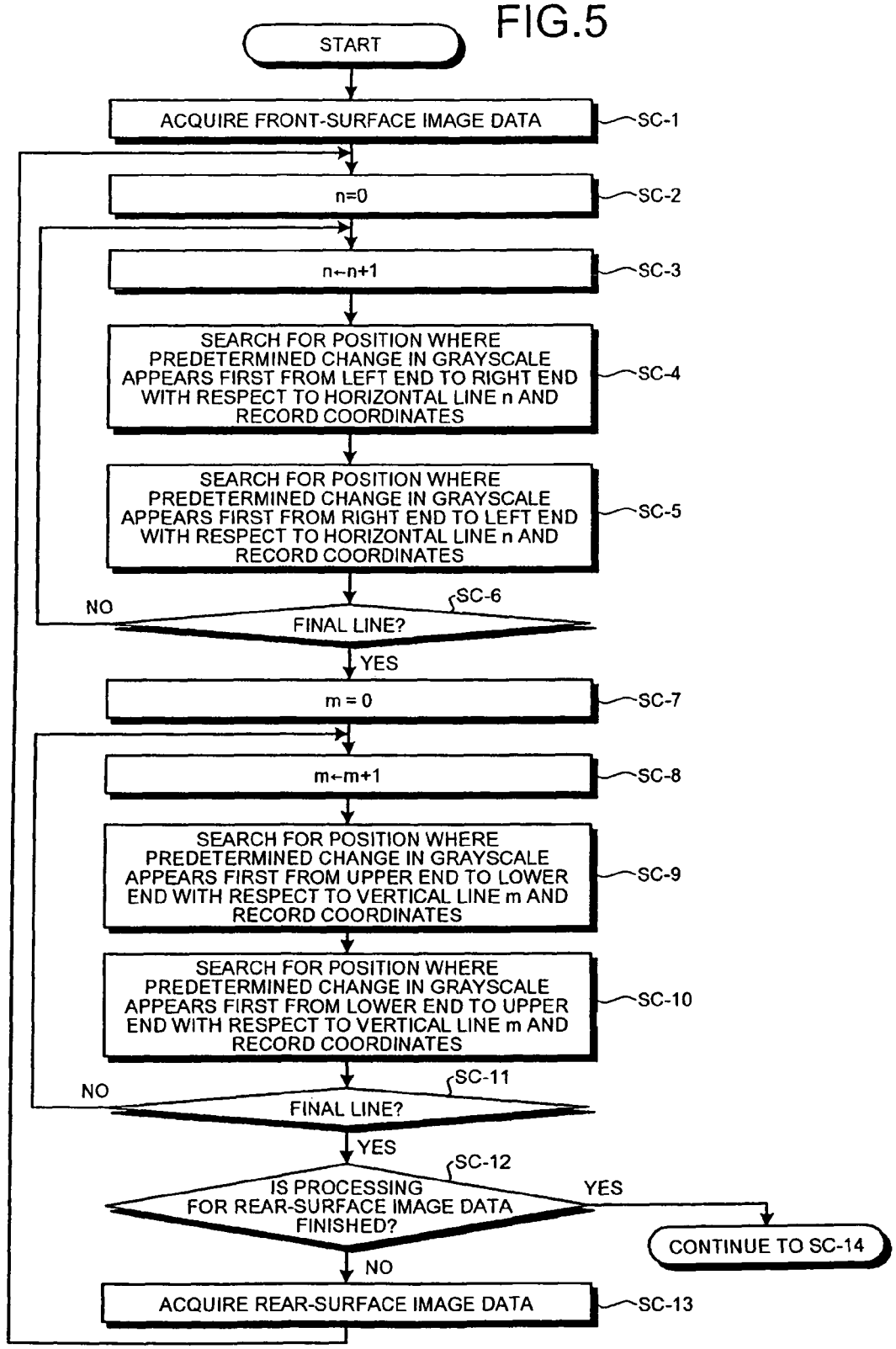
FIG. 5 is a flow chart showing an example of a coordinate acquiring process of the image-reading processing apparatus 100.

Details of a coordinate acquiring process will be explained below with reference to FIG. 5.

The coordinate acquiring unit 102b acquires front-surface and rear-surface image data read by the double-face reading control unit 102a and stored in the image file 106a (step SC-1).

The coordinate acquiring unit 102b sets a counter n of horizontal lines of an image to 0 (step SC-2).

The coordinate acquiring unit 102b increments the counter n of horizontal lines by 1 (step SC-3).

The coordinate acquiring unit 102b performs searching from a left end to right end on the horizontal line n of the front-surface image data to acquire coordinates at which a change in grayscale equal to or larger than a predetermined threshold value appears first, and records the coordinates (step SC-4). In this case, when the change in grayscale equal to or larger than the threshold value does not appear, no coordinates are acquired (this applies to the following description also). The coordinate acquiring unit 102b may measure, in addition to the change in grayscale, a grayscale value, a statistically mechanical index (for example, standard deviation, variance, or the like), or a difference between the image data and the reference data as a subject to be compared with the threshold value (this applies to the following description also).

The coordinate acquiring unit 102b performs searching from the right end to the left end on the same horizontal line n to acquire coordinates at which a change in grayscale equal to or larger than a predetermined threshold value appears first and records the coordinates (step SC-5).

The coordinate acquiring unit 102b determines whether the horizontal line n is the final line (step SC-6). When it is not the final line (step SC-6, No), the coordinate acquiring unit 102b returns to step SC-3 to execute the coordinate acquiring process of the next line (steps SC-3 to SC-5).

When the coordinate acquiring unit 102b determines that the horizontal line n is the final line (step SC-6, Yes), a counter m of vertical lines is set to 0 (step SC-7).

The coordinate acquiring unit 102b increments the counter m of vertical lines by 1 (step SC-8).

The coordinate acquiring unit 102b performs searching from the upper end to the lower end on the vertical line m of the front-surface image data to acquire coordinates at which a change in grayscale equal to or larger than the predetermined threshold value appears first and records the coordinates (step SC-9).

The coordinate acquiring unit 102b performs searching from the upper end to the lower end on the same vertical line m to acquire coordinates at which a change in grayscale equal to or larger than the predetermined threshold value appears first and records the coordinates (step SC-10).

The coordinate acquiring unit 102b determines whether the vertical line m is the final line (step SC-11). When the vertical line m is not the final line (step SC-11, No), the coordinate acquiring unit 102b returns to step SC-8 to execute a coordinate acquiring process of the next line (steps SC-8 to SC-10).

When the coordinate acquiring unit 102b determines that the vertical line m is the final line (step SC-11, Yes), the coordinate acquiring unit 102b determines whether the coordinate acquiring process of the rear-surface image data is ended (step SC-12).

When it is immediately after the end of the coordinate acquiring process of the front-surface image data, the coordinate acquiring process of the rear-surface image data has not been finished (step SC-12, No). For this reason, the coordinate acquiring unit 102b acquires the rear-surface image data stored in the image file 106a (step SC-13).

The coordinate acquiring unit 102b, as in the coordinate processing to the front-surface image data described above, executes a coordinate acquiring process to the rear-surface image data (step SC-2 to SC-11). Upon completion of the coordinate acquiring process (step SC-12, Yes), the coordinate acquiring unit 102b shifts to the processes subsequent to step SC-14.

Straight Line Detecting Process to Image Processing

Figure 6:
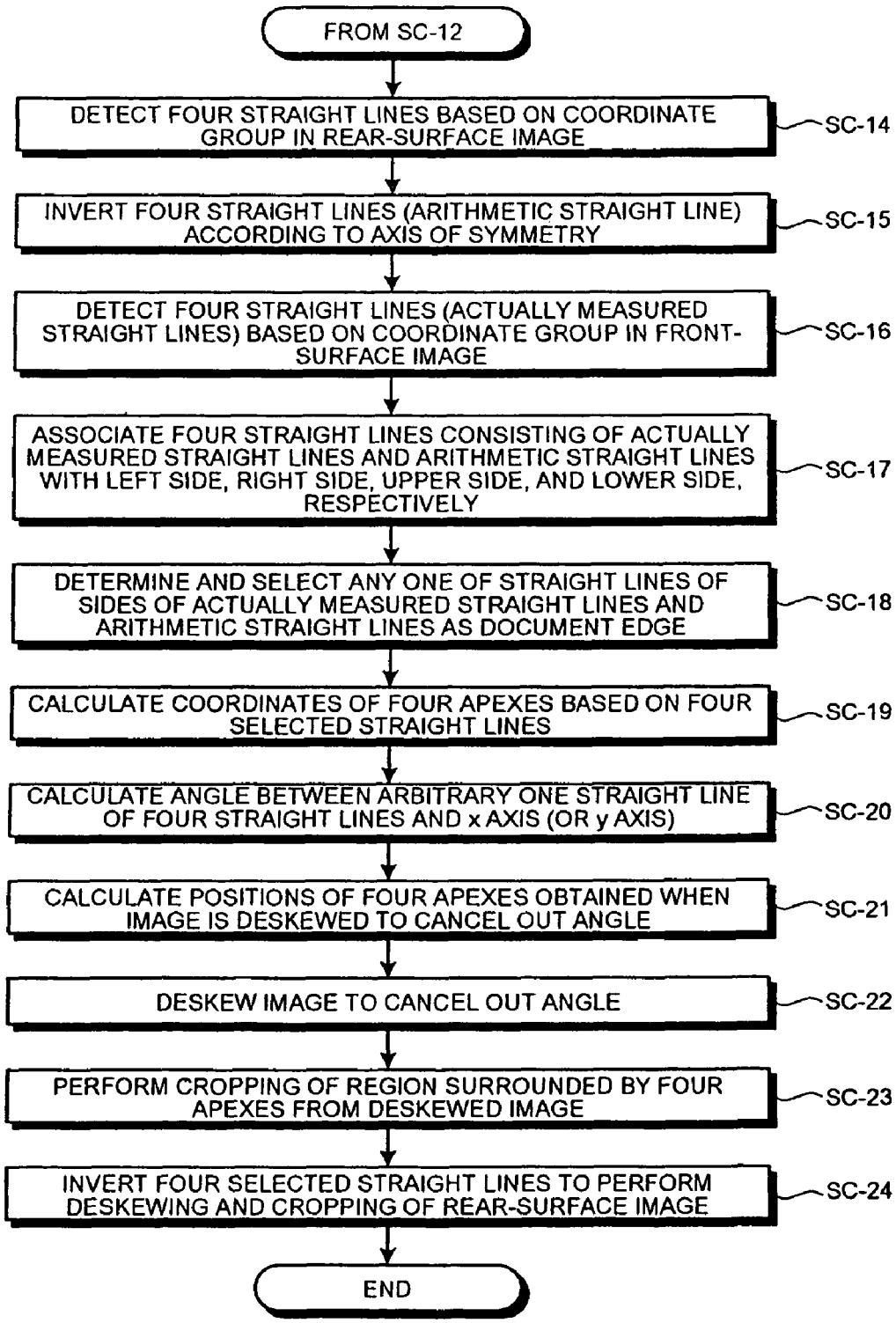
FIG. 6 is a flow chart showing an example of the straight line detecting process to the image processing in the image-reading processing apparatus 100.

Details of a straight line detecting process to image processing will be explained below with reference to FIG. 6.

Upon completion of the coordinate acquiring process of image data on both surfaces by the process of the coordinate acquiring unit 102b (step SC-12, Yes), the straight line detecting unit 102c detects four actually measured straight lines corresponding to an edge portion of a document based on a coordinate group acquired by the coordinate acquiring unit 102b based on the rear-surface image data and stored in the coordinate file 106*b* and stores the four actually measured straight lines in the straight line file 106*c* (step SC-14). In this case, the straight line detecting unit 102*c* acquires the four straight lines on the assumption that the document is in general, rectangular. However, in addition to this, the straight line detecting unit 102*c* may detect the actually measured straight lines. The straight line detecting unit 102*c* may use Hough transformation or a least-square method to detect the straight lines from the coordinate groups.

The inverting unit 102*d* inverts the four actually measured straight lines detected by the straight line detecting unit 102*c* according to the symmetric property between the front surface and the rear surface (in general, horizontal symmetry or vertical symmetry) to create arithmetic straight lines (step SC-15).

The straight line detecting unit 102*c* detects four actually measured straight lines corresponding to the edge portion of the document based on the coordinate group acquired by the coordinate acquiring unit 102*b* based on the front-surface image data and stored in the coordinate file 106*b* (step SC-16).

The straight line selecting unit 102*e* associates the four actually measured straight lines of the front-surface image detected by the straight line detecting unit 102*c* and the four arithmetic straight lines obtained by inverting the actually measured straight lines of the rear-surface image by the inverting unit 102*d* with the left sides, the right sides, the upper sides, and the lower sides, respectively (step SC-17).

The straight line selecting unit 102*e* determines any one of sets consisting of the sides of the four associated straight lines of the actually measured straight lines and the arithmetic straight lines as a set of sides suitable for the document edges to select the sets (step SC-18). In this case, the straight line selecting unit 102*e* may select straight lines constituting an outermost contour from the sides. The straight line selecting unit 102*e* may determine any one of the actually measured straight line and the arithmetic straight line which is close to an original point as the left side, and may determine any one of the actually measured straight line and the arithmetic straight line which is far from the original point as the right side.

The image processing unit 102*h* calculates the coordinates of four apexes based on the four straight lines selected by the straight line selecting unit 102*e* (step SC-19).

The image processing unit 102*h* calculates an angle θ between arbitrary one of the four selected straight lines and an x axis (or y axis) to check a skew of the document (step SC-20).

The image processing unit 102*h* calculates positions of the four apexes when the image is skewed to cancel out the calculated angle θ (more specifically, −θ skew) (step SC-21). In this case, the image processing unit 102*h* may execute a skewing process by affine transformation.

The image processing unit 102*h* skews the image by −θ to cancel out the angle (deskewing process) (step SC-22).

The image processing unit 102*h* crops a region surrounded by the four apexes from the deskewed image (cropping process) (step SC-23).

The inverting unit 102*d* inverts the four selected straight lines and execute the same image processing as in steps SC-19 to SC-23 to the rear-surface image data (step SC-24).

Second Embodiment of Image Reading Process

Figure 7:
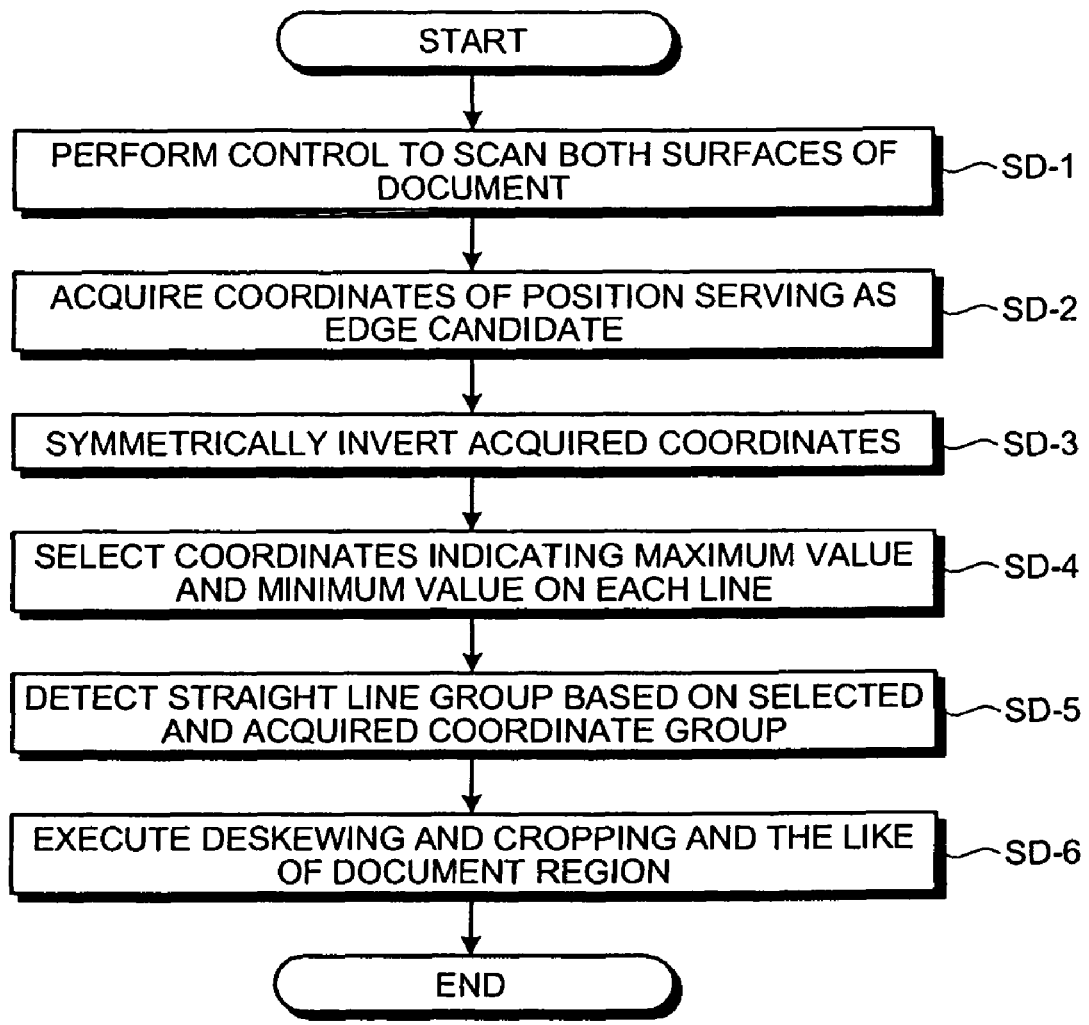
FIG. 7 is a flow chart showing an example of the second embodiment of the image reading process of the image-reading processing apparatus 100.

A second embodiment of an image reading process will be explained below with reference to FIG. 7.

More specifically, in the image reading process, the image-reading processing apparatus 100 determines any one of actually measured straight lines detected from a coordinate group and arithmetic straight lines obtained by inverting the actually measured straight lines as lines suitable for a document edge. However, in the second embodiment (will be explained below), the image-reading processing apparatus 100 performs a coordinate acquiring process and determines any one of a set of coordinates on the front surface and a set of coordinates on the rear surface as coordinates suitable for the document edge for each of lines.

The double-face reading control unit 102*a* controls the image reading unit 112 through the input/output control interface unit 108, to scan both the surfaces of a document, and stores the read image data in the image file 106*a* (step SD-1).

The coordinate acquiring unit 102*b* acquires a coordinate group serving as positions serving as the edge candidates of the document based on grayscale values in the image data on each of the surfaces read by the double-face reading control unit 102*a* and stored in the image file 106*a* (step SD-2). In this case, the coordinate acquiring unit 102*b* may acquire, as the positions serving as the edge candidates of the document, coordinates of a position having a change in grayscale, a position where a grayscale value exceeds a predetermined threshold value, a position where a statistical index of the grayscale value is equal to or larger than the predetermined threshold value. Furthermore, the coordinate acquiring unit 102*b* may create reference data based on image data of a region the breadth of which is a backing portion, compare the image data with the reference data, and acquire coordinates of a position where a predetermined difference occurs as a position serving as an edge candidate of the document. The coordinate acquiring unit 102*b* may perform searching from both the ends of each horizontal line in the image data on the surfaces to acquire two coordinates at which a change in grayscale (grayscale difference), a grayscale value, or a statistically mechanical index (for example, a standard deviation, a variance, or the like) being equal to or larger than each of the predetermined threshold values, or a difference between the coordinates and the reference data appears first. Further, the coordinate acquiring unit 102*b* may perform searching from both the ends of each vertical line in the image data to acquire two coordinates at which a change in grayscale (grayscale difference), a grayscale value, or a statistically mechanical index being equal to or larger than each of the predetermined threshold values, or a difference between the coordinates and the reference data appears first.

The inverting unit 102*d* horizontally inverts the coordinates acquired by the coordinate acquiring unit 102*b* (step SD-3).

The coordinate selecting unit 102*f* selects two coordinates indicating the maximum value and the minimum value in each horizontal line and each vertical line in the coordinate group detected by the coordinate acquiring unit 102*b* on one surface and the coordinate group obtained by inverting the coordinate group by the inverting unit 102*d* on the other surface to acquire a coordinate group (step SD-4).

The straight line detecting unit 102*c* detects a straight line group corresponding to the edge portion of the document based on the coordinate group acquired by the coordinate selecting unit 102*f* and stores the straight line group in the straight line file 106*c* (step SD-5). In this case, the straight line detecting unit 102*c* may use Hough transformation or a least-square method to detect the straight lines from the coordinate groups.

The image processing unit 102*h* determines a document region based on the straight line group detected by the straight line detecting unit 102c and executes image processing such as deskewing or cropping of the document region (step SD-6).

As described above, in the second embodiment, to determine whether coordinates are suitable for a document edge for each line, the straight line group detected based on the selected coordinate group can be used as straight lines indicating the document region without performing another determination.

Coordinate Acquiring Process to Straight Line Detecting Process

Figure 8:
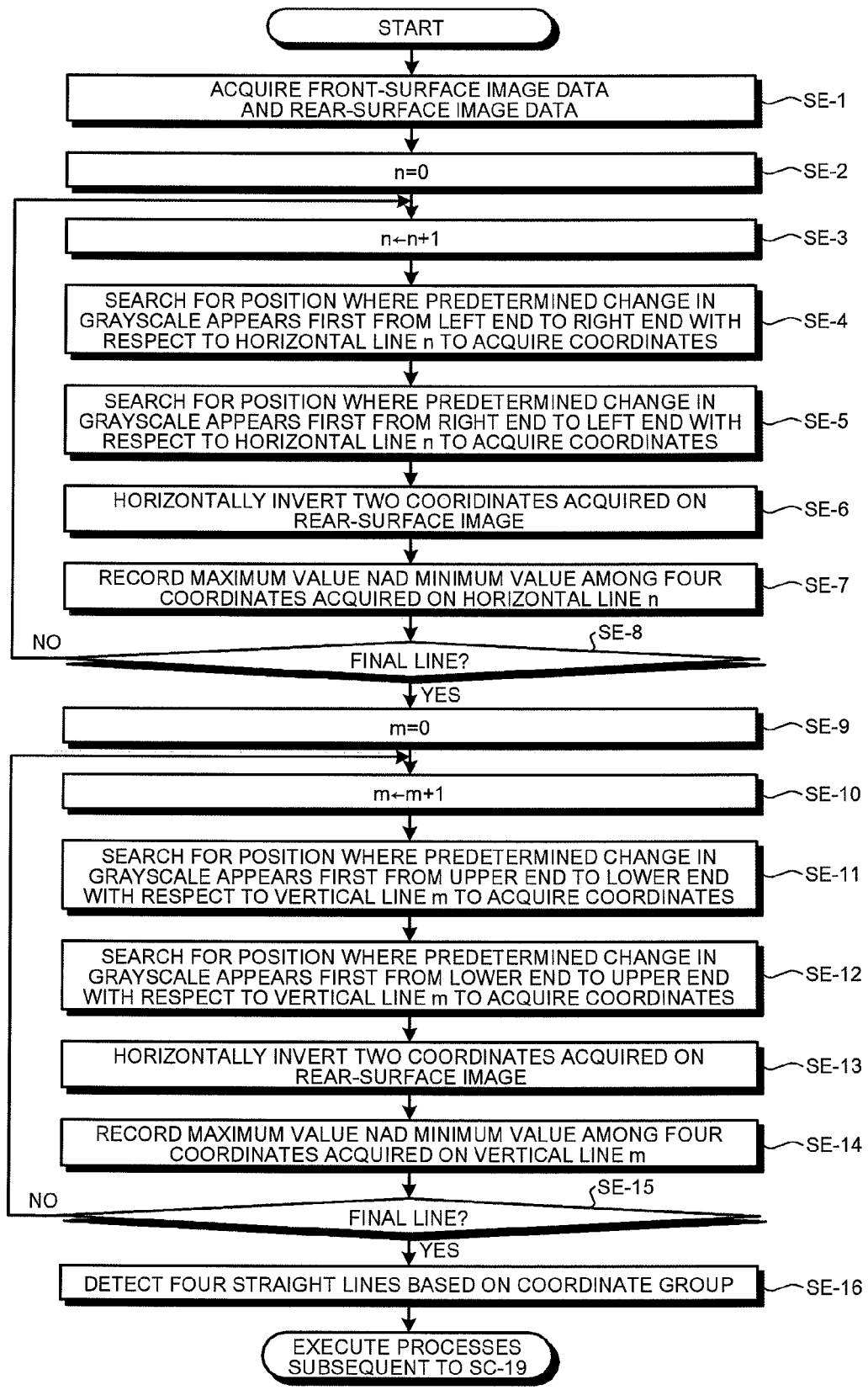
FIG. 8 is a flow chart showing an example of the coordinate acquiring process to the straight line detecting process of the image-reading processing apparatus 100 according to the second embodiment.

Details of a coordinate acquiring process to a straight line detecting process in the second embodiment will be explained with reference to FIG. 8.

The coordinate acquiring unit 102b acquires front-surface and rear-surface image data read by the double-face reading control unit 102a and stored in the image file 106a (step SE-1).

The coordinate acquiring unit 102b sets a counter n of horizontal lines of an image to 0 (step SE-2).

The coordinate acquiring unit 102b increments the counter n of horizontal lines by 1 (step SE-3).

The coordinate acquiring unit 102b performs searching from the left end to the right end on a horizontal line n for each of front-surface image data and rear-surface image data to acquire coordinates at which a change in grayscale equal to or larger than a predetermined threshold value appears first (step SE-4). In this case, the coordinate acquiring unit 102b may measure, in addition to the change in grayscale, a grayscale value, a statistically mechanical index (for example, standard deviation, variance, or the like), or a difference between the image data and the reference data as a subject to be compared with the threshold value (this applies to the following description also).

The coordinate acquiring unit 102b performs searching from the right end to the left end on the same horizontal line n to acquire coordinates at which a change in grayscale equal to or larger than a predetermined threshold value appears first (step SE-5).

The inverting unit 102d horizontally inverts two coordinates acquired based on the rear-surface image data by the process of the coordinate acquiring unit 102b (step SE-6).

The coordinate selecting unit 102f selects two coordinates including x-coordinates indicating the maximum value and the minimum value from four coordinates constituted by two coordinates acquired based on the front-surface image data by the process of the coordinate acquiring unit 102b and two coordinates based on the rear-surface image data inverted by the process of the inverting unit 102d and records the two coordinates on the coordinate file 106b (step SE-7).

The coordinate acquiring unit 102b determines whether the horizontal line n is the final line (step SE-8). When it is not the final line (step SE-8, No), the coordinate acquiring unit 102b returns to step SE-3 to execute the coordinate acquiring process to the coordinate selecting process of the next line (steps SE-3 to SE-7).

When the coordinate acquiring unit 102b determines that the horizontal line n is the final line (step SE-6, Yes), a counter m of vertical lines is set to 0 (step SE-9).

The coordinate acquiring unit 102b increments the counter m of vertical lines by 1 (step SE-10). In this case, to perform horizontal inversion to perform a coordinate selecting process to the same vertical line, the count m of vertical lines of the front-surface image data and the count m of vertical lines of the rear-surface image data may be obtained by counting the vertical lines from horizontal opposite directions.

The coordinate acquiring unit 102b performs searching from the upper end to the lower end on the vertical line m of each of the front-surface image data and rear-surface image data to acquire coordinates at which a change in grayscale equal to or larger than the predetermined threshold value appears first (step SE-11).

The coordinate acquiring unit 102b performs searching from the upper end to the lower end on the same vertical line m to acquire coordinates at which a change in grayscale equal to or larger than the predetermined threshold value appears first (step SE-12).

The inverting unit 102d horizontally inverts the two coordinates acquired based on the rear-surface image data by the process of the coordinate acquiring unit 102b (step SE-13). In this case, since a value of a y-coordinate does not change even when horizontal inversion is performed, a horizontally inverting process by the inverting unit 102d may be omitted.

The coordinate selecting unit 102f selects two coordinates including y-coordinates indicating the maximum value and the minimum value from four coordinates constituted by two coordinates acquired based on the front-surface image data by the process of the coordinate acquiring unit 102b and two coordinates based on the rear-surface image data inverted by the process of the inverting unit 102d and records the two coordinates on the coordinate file 106b (step SE-14).

The coordinate acquiring unit 102b determines whether the vertical line m is the final line (step SE-15). When the vertical line m is not the final line (step SE-15, No), the coordinate acquiring unit 102b returns to step SE-10 to execute a coordinate acquiring process of the next line (steps SE-10 to SE-14).

When the coordinate acquiring unit 102b determines the vertical line m as the final line (step SE-15, Yes), the straight line detecting unit 102c detects four straight lines based on the coordinate group stored in the coordinate file 106b. When the coordinate file 106b obtains the four straight lines, the image-reading processing apparatus 100 executes image processing subsequent to step SC-19 explained with reference to FIG. 6.

In this case, in the flow, the coordinate acquiring process, the inverting process, and the coordinate selecting process are executed for each line. However, the second embodiment is not limited to the configuration, and, after the coordinate acquiring process is executed to all the lines, the coordinate inverting process and the coordinate selecting process may be executed.

Coordinate Acquiring Process

An example of a position serving as an edge candidate in the coordinate acquiring process by the coordinate acquiring unit 102b will explained below in detail with reference to FIG. 10.

In the coordinate acquiring process by the coordinate acquiring unit 102b, as a position serving as an edge candidate of a document, coordinate of (1) a position where a change in grayscale (grayscale difference) equal to or larger than a predetermined threshold value occurs, (2) a position where a grayscale value exceeds a predetermined threshold value, (3) a position where a statistical index (for example, a standard deviation, a variance, or the like) of the grayscale value is equal to or larger than a predetermined threshold value, (4) a position where a difference between image data and reference data is equal to or larger than a threshold value, or the like may be acquired. In FIG. 10, the upper part shows image data obtained by reading a business card as a document, and a graph in the lower part shows data near a position (edge of the document) surrounded by a circle in the image data of the upper part.

More specifically, as shown in FIG. 10 as an example, the coordinate acquiring unit 102b may set (1) a position of a peak at which a grayscale difference (indicated by an alternate long and short dash line) is equal to or larger than a predetermined threshold value, (2) a position where a grayscale value (indicated by a broken line) itself exceeds a predetermined threshold value (for example, 128 grayscale values) first, or (3) a position of a peak at which a standard deviation (indicated by a solid line) is equal to or larger than a predetermined threshold value as a position serving as candidate edge of a business card document in the image data read by the process of the double-face reading control unit 102a.

The coordinate acquiring unit 102b may create reference data by image data of a region the breadth of which is a backing portion to set (4) a position where a difference between the image data and the reference data exceeds a predetermined threshold value as a position serving as an edge candidate of the document (for example, see JP-A-2007-88654). In this case, an example of a process to set a position where the image data and the reference data have a difference as the position serving as the edge candidate of the document will be explained below.

More specifically, the coordinate acquiring unit 102b determines a region the breadth of which is an image of a backing portion in the image data read by the process of the double-face reading control unit 102a and sets the region as a reference data creating region. In this case, the region the breadth of which is, for example, a set of horizontal lines which do not include a document image in the image.

The coordinate acquiring unit 102b calculates a grayscale value such as an average grayscale with respect to the reference data creating region to create reference data. For example, the coordinate acquiring unit 102b calculates an average of grayscale values of each of pixels in a 5×5 pixel range serving as a part of the reference data creating region to create reference data at a central pixel portion, and stores the reference data in the storage unit 106. The coordinate acquiring unit 102b calculates averages of the matrixes while shifting the central pixel position one pixel by one pixel over the entire width to create reference data serving as grayscale characteristics in a main reading direction of the backing portion.

The coordinate acquiring unit 102b compares the created reference data with the image data to acquire coordinates of a position where a difference equal to or larger than a predetermined threshold value occurs as the position of the edge candidate of the document. For example, the coordinate acquiring unit 102b compares the differences between the reference data and the image data one pixel by one pixel, and detects to determine a change point where the difference becomes larger than the predetermined threshold value as a position serving as the edge candidate of the document, so that the coordinates of the position are acquired.

In this case, the coordinate acquiring unit 102b may transform an image by such a tone curve that a sharp change is obtained near a grayscale of the backing portion by the image processing to detect an edge candidate position.

When the coordinate acquiring unit 102b cannot detect the document edge at the upper end or the lower end by comparing the image data with the reference data, and the image reading unit 112 is of an ADF type, the coordinate acquiring unit 102b may use information of a paper feed control mechanical sensor which is hardware to detect the document edge. More specifically, for example, the image reading unit 112 of the ADF type has a paper feed control mechanical sensor. When a document is conveyed by a paper feeding mechanism, an upper end of the document is brought into contact with the sensor, and the document is further conveyed to let the paper feed control mechanical sensor fall down, the upper end of the document is detected. When the document is further conveyed, and the paper feed control mechanical sensor returns to the document state to make it possible to detect the lower end of the document. For this reason, an upper-end over-reading amount (corresponding to a backing portion region of the upper end) and the lower-end over-reading amount (corresponding to a backing portion region of the lower end) are calculated from a conveying speed obtained by the paper feed control mechanical sensor and the paper feeding mechanism and a timing at which reading is started. Therefore, when the upper side or the lower side of the document cannot be detected, the side can be calculated by using these set values and a detection result (angle) of the left side or the right side.

The coordinate acquiring unit 102b verifies an edge detection result based on a most reliable side. When the detection result is not reliable, cropping of an image or deskewing may not be performed.

When it is assumed that there is a missing portion in a read document image in a recognition result of the document image, the coordinate acquiring unit 102b may notify a user of an abnormality with a message or the like.

Shift Amount Correcting Process

Details of a shift amount correcting process according to the embodiment will be explained with reference to FIG. 9.

The inverting unit 102d horizontally or vertically inverts coordinates or straight lines based on the symmetric property between the front surface and the rear surface. When the coordinates or the straight lines are not completely horizontally symmetrical or vertically symmetrical, a correcting process is necessary. More specifically, in the embodiment, since optical systems for the front surface and the rear surface in the image reading unit 112 are physically independent, errors occur in the optical systems in assembly processes. For this reason, even when the coordinates or the straight lines are simply horizontally or vertically inverted, a shift occurs, and a unit to correct the shift amount is necessary.

Figure 9:
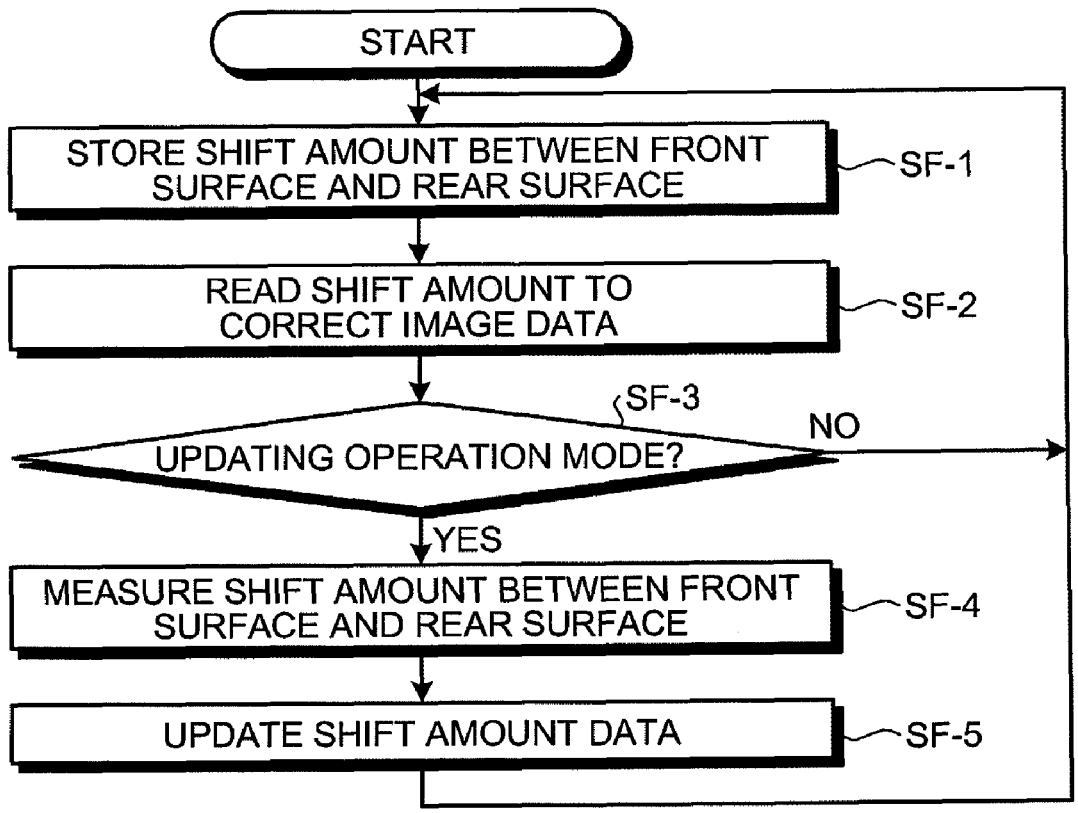
FIG. 9 is a flow chart showing an example of a shift amount correcting process of the image-reading processing apparatus 100.

As shown in FIG. 9, the correcting file 106d stores a shift amount between the front surface and the rear surface (step SF-1). In this case, shift amount data to be stored in the correcting file 106d may be data that is measured and stored in factory shipment.

The shift amount correcting unit 102g reads the shift amount data from the correcting file 106d to correct the image data stored in the image file 106a (step SF-2).

The shift amount correcting unit 102g determines whether an updating operation mode is set (step SF-3). When the updating operation mode state is not set (step SF-3, No), the shift amount correcting unit 102g stops the shift amount correcting process until the next image data is read.

when the updating mode state is set (step SF-3, Yes), the shift amount correcting unit 102g measures a shift amount between the front surface and the rear surface (step SF-4). In this case, the updating operation mode may be started when optical system parts are replaced in maintenance or the like. The shift amount correcting unit 102g may read in a symmetry reference or the like held by the image reading unit 112 to measure a shift amount.

The shift amount correcting unit 102g updates shift amount data of the correcting file 106d based on the measured shift amount (step SF-5).

The shift amount correcting unit 102g returns to the process in step SF-1 to correct image data in the next and subsequent reading step.

Another Embodiment

The embodiments of the present invention are explained above. However, the present invention may be executed in not only the embodiments but also various different embodiment without departing from the spirit and scope of the general inventive concept as defined by the appended claims and their equivalents.

In particular, in the embodiment, although the image-reading processing apparatus 100 is connected to the image reading unit 112, the image-reading processing apparatus 100 and the image reading apparatus 112 may be constructed as an integrated apparatus. More specifically, the image reading apparatus (image reading unit 112) serving as the integrated apparatus may incorporate the storage unit 106 and the control unit 102. In the embodiment, the image-reading processing apparatus 100 that performs processing in a standalone mode is explained as an example. However, processing may be performed depending on a request from a client terminal constructed in a housing different from the housing of the image-reading processing apparatus 100, and the processing result may be returned to the client terminal.

All the automatic processes explained in the present embodiment can be, entirely or in part, carried out manually. Similarly, all the manual processes explained in the present embodiment can be, entirely or in part, carried out automatically by a known method.

The process procedures, the control procedures, specific names, information including registration data of each process and parameters of search condition etc., display example, database structure mentioned in the description and drawings can be changed as required unless otherwise specified.

The constituent elements of the image-reading processing apparatus 100 are merely conceptual and may not necessarily physically resemble the structures shown in the drawings. For instance, the apparatus need not necessarily have the structure that is illustrated.

For example, the process functions performed by the image-reading processing apparatus 100, especially regarding each of the process functions executed at the control unit 102, can be entirely or partially realized by a central processing unit (CPU) or a computer program executed by the CPU or by a hardware using wired logic. The computer program, recorded on a recording medium, can be mechanically read by the image-reading processing apparatus 100 as the situation demands. In other words, the computer program recorded on the recording medium can cause the storage unit 106 such as read-only memory (ROM) or hard disk (HD) to work in coordination with the operating system (OS) to issue commands to the CPU and cause the CPU to perform various processes. The computer program is first loaded to the random access memory (RAM), and forms a control unit 102 in collaboration with the CPU.

Alternatively, the computer program can be stored in any application program server connected to the image-reading processing apparatus 100 via the network, and can be fully or partially loaded as the situation demands.

"Computer-readable recording medium" on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

"Computer program" refers to a data processing method written in any computer language and can have software codes and binary codes in any format. The computer program can be a dispersed form in the form of a plurality of modules or libraries, or can perform various functions in collaboration with a different program such as the OS. Any known configuration in the image-reading processing apparatus according to the embodiment can be used for reading the recording medium. Similarly, any known process procedure for reading or installing the computer program can be used.

The storage unit 106 (image file 106a to correcting file 106d) is a fixed disk device such as RAM, ROM, and hard disk or flexible disk, optical disk, and stores therein various programs, tables, databases required for various processes and opening websites.

The image-reading processing apparatus 100 can also be connected to any existing personal computer, workstation, etc. and can be operated by executing software (that includes computer program, data, etc.) that implements the method according to the present invention in the personal computer or workstation.

Moreover, a specific manner of distribution, and integration of the apparatus is not limited to the example as described in the drawing. A part or all of the apparatus can be distributed or integrated functionally or physically in an arbitrary unit depending on various additions.

According to the present invention, even when a difference between a density of a document and a density of a backing portion is little, a document region in a read image is automatically recognized to make it possible to perform deskewing, cropping of a document, determination of a document size, and the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-reading processing apparatus connected to an image reading apparatus being capable of reading both surface images of a document, comprising a storage unit and a control unit, wherein
the control unit includes:
a double-face reading control unit that controls the image reading apparatus to scan both the surfaces of the document;
a coordinate acquiring unit that acquires a coordinate group of a position serving as an edge candidate of the document based on a grayscale value in image data of each of the surfaces read by the double-face reading control unit;
a straight line detecting unit that detects a straight line group corresponding to an edge portion of the document based on the coordinate group acquired by the coordinate acquiring unit;
a straight line inverting unit that inverts the straight line group detected by the straight line detecting unit; and
a straight line selecting unit that determines the straight line group suitable for the edge portion from the document in the straight line group detected by the straight line detecting unit on one surface and the straight line group inverted by the straight line inverting unit on the other surface to select the straight line group.

2. An image-reading processing apparatus connected to an image reading apparatus being capable of reading both surface images of a document, comprising a storage unit and a control unit, wherein the control unit includes:

a double-face reading control unit that controls the image reading apparatus to scan both the surfaces of the document;

a coordinate acquiring unit that acquires a coordinate group of a position serving as an edge candidate of the document based on a grayscale value in image data of each of the surfaces read by the double-face reading control unit;

a coordinate inverting unit that inverts the coordinate line group acquired by the coordinate acquiring unit;

a coordinate selecting unit that selects the two coordinates indicating a maximum value and a minimum value on each horizontal line and each vertical line of the coordinate group detected by the coordinate acquiring unit on one surface and the coordinate group inverted by the coordinate inverting unit on the other surface to acquire a coordinate group; and a straight line selecting unit that detects a straight line group corresponding to an edge portion of the document based on the coordinate group acquired by the coordinate selecting unit.

3. The image-reading processing apparatus according to claim 1, wherein the coordinate acquiring unit searches for coordinates of a position where a change in grayscale occurs as the position serving as the edge candidate of the document to acquire the coordinates.

4. The image-reading processing apparatus according to claim 1, wherein the coordinate acquiring unit acquires coordinates of a position where the grayscale value exceeds a predetermined threshold value as the position serving as the edge candidate of the document.

5. The image-reading processing apparatus according to claim 1, wherein the coordinate acquiring unit acquires coordinates of a position where a statistical index of the grayscale value is equal to or greater than a predetermined threshold value as the position serving as the edge candidate of the document.

6. The image-reading processing apparatus according to claim 1, wherein the coordinate acquiring unit creates reference data by the image data in a region the breadth of which is a backing portion, compares the image data with the reference data, and acquires coordinates of a position where a predetermined difference occurs as the position serving as the edge candidate of the document.

7. The image-reading processing apparatus according to claim 2, wherein the coordinate acquiring unit searches for coordinates of a position where a change in grayscale occurs as the position serving as the edge candidate of the document to acquire the coordinates.

8. The image-reading processing apparatus according to claim 2, wherein the coordinate acquiring unit acquires coordinates of a position where the grayscale value exceeds a predetermined threshold value as the position serving as the edge candidate of the document.

9. The image-reading processing apparatus according to claim 2, wherein the coordinate acquiring unit acquires coordinates of a position where a statistical index of the grayscale value is equal to or greater than a predetermined threshold value as the position serving as the edge candidate of the document.

10. The image-reading processing apparatus according to claim 2, wherein the coordinate acquiring unit creates reference data by the image data in a region the breadth of which is a backing portion, compares the image data with the reference data, and acquires coordinates of a position where a predetermined difference occurs as the position serving as the edge candidate of the document.

11. The image-reading processing apparatus according to any one of claims 3 to 10, wherein the coordinate acquiring unit performs searching from both ends on each of the horizontal lines in the image data to acquire two coordinates at which the change in grayscale, the grayscale value, or the statistical index being equal to or larger than each of the predetermined threshold values, or the predetermined difference appears first, and performs searching from both ends on each of the vertical lines in the image data to acquire two coordinates at which the change in grayscale, the grayscale value, or the statistical index being equal to or larger than each of the predetermined threshold values, or the predetermined difference appears first.

12. The image-reading processing apparatus according to claim 1, wherein the straight line selecting unit selects the straight lines constituting an outermost contour in the straight line group.

13. The image-reading processing apparatus according to claim 1, wherein the control unit further includes:

a shift amount correcting unit that stores a shift amount of the coordinates of both the surfaces in the storage unit, and corrects the image data of each of the surfaces based on the shift amount stored in the storage unit.

14. An image-reading processing method executed by an image-reading processing apparatus connected to an image reading apparatus being capable of reading both surface images of a document, comprising a storage unit and a control unit, wherein the method comprises:

a double-face reading control step of controlling the image reading apparatus to scan both the surfaces of the document;

a coordinate acquiring step of acquiring a coordinate group of a position serving as an edge candidate of the document based on a grayscale value in image data of each of the surfaces read at the double-face reading control step;

a straight line detecting step of detecting a straight line group corresponding to an edge portion of the document based on the coordinate group acquired at the coordinate acquiring step;

a straight line inverting step of inverting the straight line group detected at the straight line detecting step; and a straight line selecting step of determining to select the straight line group suitable for the edge portion from the document in the straight line group detected at the straight line detecting step on one surface and the straight line group inverted at the straight line inverting step on the other surface.

15. An image-reading processing method executed by an image-reading processing apparatus connected to an image reading apparatus being capable of reading both surface images of a document, comprising a storage unit and a control unit, wherein the method comprises:
a double-face reading control step of controlling the image reading apparatus to scan both the surfaces of the document;
a coordinate acquiring step of acquiring a coordinate group of a position serving as an edge candidate of the document based on a grayscale value in image data of each of the surfaces read at the double-face reading control step;
a coordinate inverting step of inverting the coordinate line group acquired at the coordinate acquiring step;
a coordinate selecting step of selecting the two coordinates indicating a maximum value and a minimum value on each horizontal line and each vertical line of the coordinate group detected at the coordinate acquiring step on one surface and the coordinate group inverted at the coordinate inverting step on the other surface to acquire a coordinate group; and
a straight line selecting step of detecting a straight line group corresponding to an edge portion of the document based on the coordinate group acquired at the coordinate selecting step.

16. An image reading apparatus being capable of reading both surface images of a document, comprising a storage unit and a control unit, wherein the control unit includes:
a double-face reading control unit that controls to scan both the surfaces of the document;
a coordinate acquiring unit that acquires a coordinate group of a position serving as an edge candidate of the document based on a grayscale value in image data of each of the surfaces read by the double-face reading control unit;
a straight line detecting unit that detects a straight line group corresponding to an edge portion of the document based on the coordinate group acquired by the coordinate acquiring unit;
a straight line inverting unit that inverts the straight line group detected by the straight line detecting unit; and
a straight line selecting unit that determines the straight line group suitable for the edge portion from the document in the straight line group detected by the straight line detecting unit on one surface and the straight line group inverted by the straight line inverting unit on the other surface to select the straight line group.

17. An image reading apparatus being capable of reading both surface images of a document, comprising a storage unit and a control unit, wherein the control unit includes:
a double-face reading control unit that controls to scan both the surfaces of the document;
a coordinate acquiring unit that acquires a coordinate group of a position serving as an edge candidate of the document based on a grayscale value in image data of each of the surfaces read by the double-face reading control unit;
a coordinate inverting unit that inverts the coordinate line group acquired by the coordinate acquiring unit;
a coordinate selecting unit that selects the two coordinates indicating a maximum value and a minimum value on each horizontal line and each vertical line of the coordinate group detected by the coordinate acquiring unit on one surface and the coordinate group inverted by the coordinate inverting unit on the other surface to acquire a coordinate group; and
a straight line selecting unit that detects a straight line group corresponding to an edge portion of the document based on the coordinate group acquired by the coordinate selecting unit.

18. An image-reading processing method executed by an image reading apparatus being capable of reading both surface images of a document, comprising a storage unit and a control unit, wherein the method comprises:
a double-face reading control step of controlling to scan both the surfaces of the document;
a coordinate acquiring step of acquiring a coordinate group of a position serving as an edge candidate of the document based on a grayscale value in image data of each of the surfaces read at the double-face reading control step;
a straight line detecting step of detecting a straight line group corresponding to an edge portion of the document based on the coordinate group acquired at the coordinate acquiring step;
a straight line inverting step of inverting the straight line group detected at the straight line detecting step; and
a straight line selecting step of determining to select the straight line group suitable for the edge portion from the document in the straight line group detected at the straight line detecting step on one surface and the straight line group inverted at the straight line inverting step on the other surface.

19. An image-reading processing method executed by an image reading apparatus being capable of reading both surface images of a document, comprising a storage unit and a control unit, wherein the method comprises:
a double-face reading control step of controlling to scan both the surfaces of the document;
a coordinate acquiring step of acquiring a coordinate group of a position serving as an edge candidate of the document based on a grayscale value in image data of each of the surfaces read at the double-face reading control step;
a coordinate inverting step of inverting the coordinate line group acquired at the coordinate acquiring step;
a coordinate selecting step of selecting the two coordinates indicating a maximum value and a minimum value on each horizontal line and each vertical line of the coordinate group detected at the coordinate acquiring step on one surface and the coordinate group inverted at the coordinate inverting step on the other surface to acquire a coordinate group; and
a straight line selecting step of detecting a straight line group corresponding to an edge portion of the document based on the coordinate group acquired at the coordinate selecting step.

* * * * *